US012686195B2

(12) United States Patent
Furuta et al.

(10) Patent No.: US 12,686,195 B2
(45) Date of Patent: Jul. 21, 2026

(54) TRANSPARENT RESIN FILM, DECORATIVE MATERIAL, AND METHOD FOR PRODUCING DECORATIVE MATERIAL

(71) Applicant: Dai Nippon Printing Co., Ltd., Tokyo (JP)

(72) Inventors: Satoshi Furuta, Tokyo (JP); Ryo Fujii, Tokyo (JP); Yoshiaki Netsu, Tokyo (JP); Tomomi Nakajima, Tokyo (JP); Yosuke Sumida, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 540 days.

(21) Appl. No.: 17/442,185

(22) PCT Filed: Mar. 19, 2020

(86) PCT No.: PCT/JP2020/012394
§ 371 (c)(1),
(2) Date: Sep. 23, 2021

(87) PCT Pub. No.: WO2020/196303
PCT Pub. Date: Oct. 1, 2020

(65) Prior Publication Data
US 2022/0168991 A1 Jun. 2, 2022

(30) Foreign Application Priority Data

Mar. 27, 2019 (JP) ................................. 2019-060610

(51) Int. Cl.
*B32B 3/30* (2006.01)
*B32B 7/027* (2019.01)
(Continued)

(52) U.S. Cl.
CPC ................ *B32B 3/30* (2013.01); *B32B 7/027* (2019.01); *B32B 7/12* (2013.01); *B32B 27/08* (2013.01);
(Continued)

(58) Field of Classification Search
CPC .. B32B 3/30; B32B 7/027; B32B 7/12; B32B 27/08; B32B 27/20
See application file for complete search history.

(56) References Cited

U.S. PATENT DOCUMENTS 6,551,687 B1 4/2003 Sato et al.
6,863,956 B1 3/2005 Nakajima et al.
(Continued)

FOREIGN PATENT DOCUMENTS

CN 101279506 A 10/2008
CN 102129092 A 7/2011
(Continued)

OTHER PUBLICATIONS

"Technical materials, Various characteristics of plastic materials," Tonichi Kyosan Cable, Ltd., pp. 93-94 and Information sheet in English. (cited in the ISR).
(Continued)

*Primary Examiner* — Maria V Ewald
*Assistant Examiner* — Ethan Weydemeyer
(74) *Attorney, Agent, or Firm* — Troutman Pepper Locke LLP; James E. Armstrong, IV

(57) ABSTRACT

The present invention provides a transparent resin film that has excellent embossability and is capable of reducing or preventing air entrainment to provide high design quality, a decorative material including the transparent resin film, and a method for producing a decorative material. The present invention relates to a transparent resin film to be laminated on a substrate including a picture layer, the transparent resin (Continued)

film including at least a base layer and a top layer sequentially from a side to be laminated on the substrate, the transparent resin film having a pattern of protrusions and depressions on a side opposite to the side to be laminated on the substrate, the base layer having a lower softening temperature than the top layer.

16 Claims, 3 Drawing Sheets

(51) Int. Cl.
  *B32B 7/12* (2006.01)
  *B32B 27/08* (2006.01)
  *B32B 27/20* (2006.01)
(52) U.S. Cl.
  CPC .......... *B32B 27/20* (2013.01); *B32B 2250/02* (2013.01); *B32B 2250/24* (2013.01); *B32B 2255/10* (2013.01); *B32B 2255/26* (2013.01); *B32B 2307/3065* (2013.01); *B32B 2307/308* (2013.01); *B32B 2307/412* (2013.01); *B32B 2307/732* (2013.01); *B32B 2451/00* (2013.01)

(56) References Cited

U.S. PATENT DOCUMENTS

| | | | |
|---|---|---|---|
| 2004/0191482 A1 | 9/2004 | Nakajima et al. | |
| 2005/0287341 A1 | 12/2005 | Nakajima et al. | |
| 2006/0182984 A1 | 8/2006 | Abele et al. | |
| 2007/0042160 A1 | 2/2007 | Nakajima et al. | |
| 2007/0231550 A1 | 10/2007 | Stenzel | |
| 2008/0051495 A1 | 2/2008 | Murakami et al. | |
| 2009/0076185 A1* | 3/2009 | Berit-Debat | C08F 285/00 |
| | | | 525/94 |
| 2010/0291317 A1 | 11/2010 | Imaoku et al. | |
| 2011/0045284 A1 | 2/2011 | Matsukawa et al. | |
| 2011/0052880 A1 | 3/2011 | Iizuka et al. | |
| 2011/0091690 A1 | 4/2011 | Lin et al. | |
| 2011/0151208 A1 | 6/2011 | Huang et al. | |
| 2011/0263764 A1* | 10/2011 | Tishkov | C08L 85/02 |
| | | | 524/115 |
| 2014/0349096 A1 | 11/2014 | Miyazaki et al. | |
| 2016/0076528 A1 | 3/2016 | Kato et al. | |
| 2016/0089849 A1 | 3/2016 | Kayanoki et al. | |
| 2016/0325535 A1 | 11/2016 | Ueno et al. | |
| 2018/0043653 A1* | 2/2018 | Sutou | B32B 27/40 |
| 2019/0047246 A1 | 2/2019 | Bayer et al. | |
| 2019/0202192 A1 | 7/2019 | Sekino et al. | |
| 2019/0248100 A1 | 8/2019 | Horio et al. | |
| 2021/0283879 A1 | 9/2021 | Ueno | |
| 2022/0001645 A1 | 1/2022 | Fujii et al. | |
| 2022/0118735 A1 | 4/2022 | Fujii et al. | |

FOREIGN PATENT DOCUMENTS

| | | |
|---|---|---|
| CN | 105142903 A | 12/2015 |
| CN | 105459526 A | 4/2016 |
| CN | 108284654 A | 7/2018 |
| EP | 3098071 A1 | 11/2016 |
| EP | 3210772 A1 | 8/2017 |
| EP | 3446873 A1 | 2/2019 |
| EP | 3521017 A1 | 8/2019 |
| EP | 3865297 A1 | 8/2021 |
| JP | H07-256752 A | 10/1995 |
| JP | H09-141812 A | 6/1997 |
| JP | H10-211675 A | 8/1998 |
| JP | H10-217407 A | 8/1998 |
| JP | H11-115106 A | 4/1999 |
| JP | H11-157297 A | 6/1999 |
| JP | 2000-015768 A | 1/2000 |
| JP | 2000-289162 A | 10/2000 |
| JP | 2000-335628 A | 12/2000 |
| JP | 2000-343649 A | 12/2000 |
| JP | 2001-150540 A | 6/2001 |
| JP | 2002-036467 A | 2/2002 |
| JP | 2003-056168 A | 2/2003 |
| JP | 2004-090507 A | 3/2004 |
| JP | 2005-120255 A | 5/2005 |
| JP | 2005-154762 A | 6/2005 |
| JP | 2005-313142 A | 11/2005 |
| JP | 2006-068947 A | 3/2006 |
| JP | 2006-077173 A | 3/2006 |
| JP | 2006-306020 A | 11/2006 |
| JP | 2007-090797 A | 4/2007 |
| JP | 2007-106056 A | 4/2007 |
| JP | 2007-297568 A | 11/2007 |
| JP | 2008-238601 A | 10/2008 |
| JP | 2010-069709 A | 4/2010 |
| JP | 2012035513 A | 2/2012 |
| JP | 2012-076347 A | 4/2012 |
| JP | 2012-106506 A | 6/2012 |
| JP | 2013-104923 A | 5/2013 |
| JP | 2015-074091 A | 4/2015 |
| JP | 2016-035036 A | 3/2016 |
| JP | 2016-074162 A | 5/2016 |
| JP | 2016-168711 A | 9/2016 |
| JP | 2016-190480 A | 11/2016 |
| JP | 2016-210141 A | 12/2016 |
| JP | 2017035011 A | 2/2017 |
| JP | 2017-042975 A | 3/2017 |
| JP | 2017-155227 A | 9/2017 |
| JP | 2017-185773 A | 10/2017 |
| JP | 2018-058284 A | 4/2018 |
| JP | 2018-089970 A | 6/2018 |
| JP | 2019-052262 A | 4/2019 |
| JP | 2019-511970 A | 5/2019 |
| JP | 2019-155777 A | 9/2019 |
| JP | 2020-062879 A | 4/2020 |
| JP | 2020-111062 A | 7/2020 |
| TW | 201114624 A | 5/2011 |
| TW | 201827223 A | 8/2018 |
| WO | 2018/062299 A1 | 4/2018 |
| WO | 2018/062340 A1 | 4/2018 |

OTHER PUBLICATIONS

Written Opinion of the ISA mailed Jun. 16, 2020, issued for PCT/JP2020/012394.

* cited by examiner

TRANSPARENT RESIN FILM, DECORATIVE MATERIAL, AND METHOD FOR PRODUCING DECORATIVE MATERIAL

TECHNICAL FIELD

The present invention relates to a transparent resin film, a decorative material, and a method for producing a decorative material.

BACKGROUND ART

Decorative materials are commonly used for decorating components used in building materials, furniture, home electrical appliances, or the like.

Decorative materials consisting only of a substrate including a picture layer commonly have insufficient surface properties such as scratch resistance, contamination resistance, and weather resistance. Accordingly, a thermoplastic resin film is laminated to the substrate to impart surface properties.

In order to impart a visual or tactile design to decorative materials, a pattern of protrusions and depressions may be formed by embossing the thermoplastic resin film to be laminated to the substrate.

Patent Literature 1, for example, discloses a decorative sheet including a base sheet on which printing is performed and a protective sheet laminated on the base sheet. The decorative sheet has a surface embossed to have a pattern of protrusions and depressions for imparting a design.

Thermal lamination has been conventionally employed for lamination of a thermoplastic resin film on a substrate as it requires no adhesive to eliminate concerns about peeling of the substrate due to adhesive degradation or the like.

However, when a thermoplastic resin film is subjected to embossing, a pattern of protrusions and depressions corresponding to the pattern of protrusions and depressions on the embossed side is unintendedly formed on the opposite side.

Thus, in thermal lamination at low temperature, air entrainment may occur due to the pattern of protrusions and depressions on the side to be laminated on the substrate to impair the design quality, which leaves room for improvement.

CITATION LIST

Patent Literature

Patent Literature 1: JP 2000-15768 A

SUMMARY OF INVENTION

Technical Problem

The present invention aims to solve the above problem and provide a transparent resin film that has excellent embossability and is capable of reducing or preventing air entrainment to provide high design quality, a decorative material including the transparent resin film, and a method for producing a decorative material.

Solution to Problem

The present inventors made intensive studies to solve the above problem, and focused on the characteristics of a transparent resin film. As a result, they found out use of a transparent resin film including at least two transparent thermoplastic resin layers (base layer/top layer) sequentially from the side to be laminated on the substrate, in which the base layer and the top layer contain resins having different softening temperatures.

Specifically, when a thermoplastic resin film to be laminated on a substrate including a picture layer includes a base layer having one side to be laminated on the substrate and a top layer facing the other side of the base layer, and the base layer has a lower softening temperature than the top layer, even in thermal lamination of the thermoplastic resin film at low temperature, the embossed shape on the top layer is not impaired and the base layer is softened to follow the substrate, thereby reducing or preventing air entrainment during the lamination. They found out that a design quality loss during lamination of a transparent resin film on a substrate including a picture layer can be thus reduced or prevented, thereby completing the present invention.

Specifically, the present invention relates to a transparent resin film to be laminated on a substrate including a picture layer, the transparent resin film including at least a base layer and a top layer sequentially from a side to be laminated on the substrate, the transparent resin film having a pattern of protrusions and depressions on a side opposite to the side to be laminated on the substrate, the base layer having a lower softening temperature than the top layer.

In the transparent resin film of the present invention, preferably, the base layer has a softening temperature of 100° C. or higher and 150° C. or lower. Preferably, the top layer has a softening temperature of 130° C. or higher and 160° C. or lower.

Preferably, the transparent resin film has a maximum height Rz defined in JIS B 0601 (2001) of 80 μm or less on the side to be laminated on the substrate.

Preferably, the transparent resin film further includes a surface protective layer on an opposite side of the top layer to the base layer.

Preferably, at least one layer of the base layer or the top layer contains a flame retardant.

Preferably, the at least one layer containing the flame retardant, of the base layer and the top layer, contains a filler.

Preferably, the surface protective layer contains a flame retardant.

Preferably, the flame retardant is at least one selected from the group consisting of a phosphinic acid metal salt-based flame retardant, a phosphazene-based flame retardant, and a NOR hindered amine-based flame retardant. The present invention also relates to a decorative material including: a substrate including a picture layer; and the transparent resin film laminated on the substrate.

The present invention also relates to a method for producing a decorative material, including: laminating the transparent resin film on a substrate including a picture layer at a temperature not lower than the softening temperature of the base layer and not higher than the softening temperature of the top layer.

The present invention also relates to a method for producing a decorative material including a substrate including a picture layer and the transparent resin film sequentially, the method including: forming a transparent adhesive layer on a side to be laminated on the picture layer of the transparent resin film; and bonding the transparent resin film and the picture layer with the transparent adhesive layer.

Advantageous Effects of Invention

The present invention can provide a transparent resin film that has excellent embossability and is capable of reducing or preventing air entrainment to provide high design quality, a decorative material including the transparent resin film, and a method for producing a decorative material.

DESCRIPTION OF EMBODIMENTS

<Transparent Resin Film>

A description is given on the transparent resin film of the present invention hereinbelow.

The numerical range indicated by "-" herein means "the lower limit or larger and the upper limit or smaller" (e.g., the range "α-β" refers to the range "a or larger and (3 or smaller").

Figure 1:
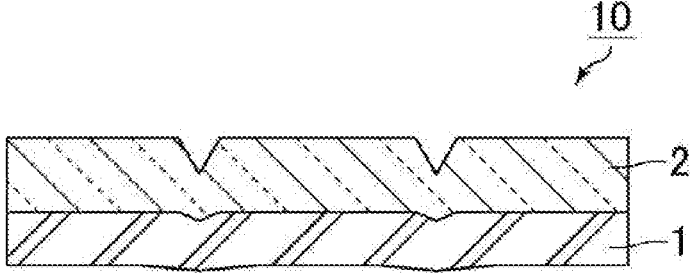
FIG. 1 is a cross-sectional view illustrating an embodiment of the transparent resin film of the present invention.

FIG. 1 is a cross-sectional view illustrating an embodiment of the transparent resin film of the present invention.

As illustrated in FIG. 1, a transparent resin film 10 of the present invention includes at least a base layer 1 having one side to be laminated on the substrate and a top layer 2 facing the other side of the base layer, and has a pattern of protrusions and depressions on a side opposite to the side to be laminated on the substrate. The base layer 1 has a lower softening temperature than the top layer 2.

With such a structure, even in thermal lamination at low temperature, the embossed shape on the top layer 2 is not impaired and the base layer 1 is softened to reduce or prevent air entrainment during the lamination on a substrate, thereby reducing or preventing a design quality loss during the lamination of the transparent resin film 10 on a substrate.

(Base Layer)

In the transparent resin film 10 of the present invention, the base layer 1 has a lower softening temperature than the top layer 2.

From the standpoint of allowing the base layer 1 to be softened upon lamination of the transparent resin film 10 to follow the substrate, which suitably reduces or prevents air entrainment, the base layer 1 has a softening temperature of preferably 100° C. or higher and 150° C. or lower, more preferably 100° C. or higher and 130° C. or lower.

The "softening temperature" as used herein is in conformity with JIS K 7196:2012 "Testing method for softening temperature of thermoplastic film and sheeting by thermomechanical analysis". Specifically, measurement is performed using a thermomechanical analyzer (TMA SS6100, indenter tip diameter: 1.0 mm, available from Seiko Instruments Inc.) at a load of 500 mN, a rate of temperature rise of 5° C./min in a range of +30° C. to +200° C. in the penetration mode. In the resulting TMA curve, the straight line on a lower temperature side than the temperature at which the indenter starts to penetrate is extended to a higher temperature side, and the tangent line at the part where the penetration speed reaches maximum is extended to a lower temperature side. The temperature at the intersection of these two extended straight lines is a penetration temperature. The penetration temperature is used as the softening temperature.

The base layer 1 may be any colorless and transparent, colored transparent, or translucent layer through which the picture layer of the substrate is visible. The base layer 1 may be made of any material, and preferably contains a thermoplastic resin.

Examples of the thermoplastic resin include: olefin-based thermoplastic resins such as low-density polyethylene (including linear low-density polyethylene), medium-density polyethylene, high-density polyethylene, ethylene-α olefin copolymers, homopolypropylene, polymethylpentene, polybutene, ethylene-propylene copolymers, propylene-butene copolymers, ethylene-vinyl acetate copolymers, saponified ethylene-vinyl acetate copolymers, or mixtures of these; thermoplastic ester-based resins such as polyethylene terephthalate, polybutylene terephthalate, polyethylene naphthalate, polyethylene naphthalate-isophthalate copolymers, polycarbonate, or polyarylate; acrylic thermoplastic resins such as polymethyl methacrylate, polyethyl methacrylate, polyethyl acrylate, or polybutyl acrylate; polyamide-based thermoplastic resins such as Nylon 6 or Nylon 66; polyimide; polyurethane; polystyrene; acrylonitrile-butadiene-styrene resins; ionomers; and polyvinyl chloride.

Each of these thermoplastic resins may be used alone or in combination of two or more. In particular, olefin-based thermoplastic resins are preferred because they have excellent adhesion of a picture layer and excellent embossability and are inexpensive.

From the standpoint of suitably satisfying the softening temperature described above, the base layer 1 preferably contains, among the above thermoplastic resins, an olefin-based thermoplastic resin or an ionomer, more preferably a polypropylene-based resin such as an ethylene-α olefin copolymer, homopolypropylene, an ethylene-propylene copolymer, or a propylene-butene copolymer.

From the standpoint of allowing the base layer 1 to suitably follow the substrate upon lamination of the transparent resin film 10 to suitably reduce or prevent air entrainment, the base layer 1 has a thickness of preferably 30 μm or larger and 300 μm or smaller, more preferably 40 μm or larger and 150 μm or smaller, still more preferably 50 μm or larger and 120 μm or smaller.

(Top Layer)

In the transparent resin film 10 of the present invention, the top layer 2 has a softening temperature higher than the temperature of laminating the transparent resin film 10 on the substrate.

From the standpoint of reducing or preventing damage to the embossed shape during lamination of the transparent resin film 10, the top layer 2 has a softening temperature of preferably 130° C. or higher and 160° C. or lower, more preferably 140° C. or higher and 155° C. or lower.

The top layer 2 may be any colorless and transparent, colored transparent, or translucent layer through which the picture layer of the substrate is visible, as is the case with base layer 1. The top layer 2 may be made of any material, and preferably contains any of the thermoplastic resins described above.

From the standpoint of suitably satisfying the softening temperature described above and suitably imparting scratch resistance and the like, the material is preferably an olefin-based thermoplastic resin or an ionomer, more preferably a polypropylene-based material such as homopolypropylene, an ethylene-propylene copolymer, or a propylene-butene copolymer, among the thermoplastic resins.

The top layer 2 may have any thickness. From the standpoint of suitably imparting scratch resistance and the like, the thickness is preferably 30 μm or larger and 300 μm or smaller, more preferably 40 μm or larger and 150 μm or smaller, still more preferably 50 μm or larger and 120 μm or smaller.

(Base Layer and Top Layer)

The base layer 1 and the top layer 2 may be colored. In that case, colorants may be added to the thermoplastic resin. Examples of usable colorants include pigments or dyes used in a picture layer described later.

The base layer 1 and the top layer 2 preferably contain a flame retardant.

When at least one of the base layer 1 or the top layer 2 contains a flame retardant, flammability is reduced by formation of char, capture of radicals in combustion gas, or the like during combustion.

Examples of the flame retardant include phosphinic acid metal salt-based flame retardants, phosphazene-based flame retardants, NOR hindered amine-based flame retardants, halogen-based flame retardants, antimony-based flame retardants, metal hydroxide-based flame retardants, and phosphoric acid ester-based flame retardants.

From the environmental standpoint and the standpoint of reducing the amount added for maintaining the transparency of the layer containing the flame retardant, preferred is at least one selected from the group consisting of phosphinic acid metal salt-based flame retardants, phosphazene-based flame retardants, and NOR hindered amine-based flame retardants. Preferred is at least one selected from the group consisting of phosphinic acid metal salt-based flame retardants and phosphazene-based flame retardants, because it can trap radicals generated from organic matters during combustion to disturb continuous combustion and exhibits an effect of suppressing flame spread in a horizontal flammability test. From the standpoint of achieving an effect of reducing the calorific value in the flammability test in accordance with ISO 5660-1, preferred is a NOR hindered amine-based flame retardant.

Examples of the phosphinic acid metal salt-based flame retardants include aluminum tris(diethylphosphinate), aluminum tris(methyl ethyl phosphinate), aluminum tris(diphenyl phosphinate), zinc bis(diethyl phosphinate), zinc bis(methyl ethyl phosphinate), zinc bis(diphenyl phosphinate), titanyl bis(diethyl phosphinate), titanium tetrakis(diethyl phosphinate), titanyl bis(methyl ethyl phosphinate), titanium tetrakis(methyl ethyl phosphinate), titanyl bis(diphenyl phosphinate), and titanium tetrakis(diphenyl phosphinate).

Examples of commercially available phosphinic acid metal salt-based flame retardants include "EXOLIT OP-930", "EXOLIT OP-935", "EXOLIT OP-1230", "EXOLIT OP-1240", and "EXOLIT OP-1312" (product name) all available from Clariant Japan.

Examples of the phosphazene-based flame retardants include: phenoxy phosphazene; cyclic and/or linear $C_{1-6}$ alkyl $C_{6-20}$ aryloxy phosphazene such as (poly)tolyloxyphosphazene (e.g., o-tolyloxyphosphazene, m-tolyloxyphosphazene, p-tolyloxyphosphazene, o,m-tolyloxyphosphazene, o,p-tolyloxyphosphazene, m,p-tolyloxyphosphazene, o,m,p-tolyloxyphosphazene), (poly)xylyloxyphosphazene; and cyclic and/or linear $C_{6-20}$ aryl $C_{1-10}$ alkyl $C_{6-20}$ aryloxy phosphazene such as (poly)phenoxytolyloxyphosphazene (e.g., phenoxy o-tolyloxyphosphazene, phenoxy m-tolyloxyphosphazene, phenoxy p-tolyloxyphosphazene, phenoxy o,m-tolyloxyphosphazene, phenoxy o,p-tolyloxyphosphazene, phenoxy m,p-tolyloxyphosphazene, phenoxy o,m,p-tolyloxyphosphazene), (poly) phenoxyxylyloxyphosphazene, and (poly) phenoxytolyloxyxylyloxyphosphazene. Preferred examples include cyclic and/or linear phenoxy phosphazene, cyclic and/or linear $C_{1-3}$ alkyl $C_{6-20}$ aryloxy phosphazene, and $C_{6-20}$ aryloxy $C_{1-3}$ alkyl $C_{6-20}$ aryloxy phosphazene such as cyclic and/or linear tolyloxyphosphazene and cyclic and/or linear phenoxytolylphenoxyphosphazene.

The examples further include compounds having a crosslinked structure of a 4,4'-diphenylene group such as compounds having a crosslinked structure of 4,4'-sulfonyldiphenylene (bisphenol S residue), compounds having a crosslinked structure of a 2,2-(4,4'-diphenylene)isopropylidene group, compounds having a crosslinked structure of a 4,4'-oxydiphenylene group, and compounds having a crosslinked structure of a 4,4'-thiodiphenylene group.

Examples of the NOR hindered amine-based flame retardants include 1-cyclohexyloxy-2,2,6,6-tetramethyl-4-octadecylaminopiperidine; bis(1-octyloxy-2,2,6,6-tetramethylpiperidin-4-yl)sebacate; 2,4-bis[(1-cyclohexyloxy-2,2,6,6-tetramethylpiperidin-4-yl)butylamino]-6-(2-hydroxyethylamino)-s-triazine; bis(1-cyclohexyloxy-2,2,6,6-tetramethylpiperidin-4-yl)adipate; an oligomeric compound that is a condensation product of 4,4'-hexamethylenebis(amino-2,2,6,6-tetramethylpiperidine) and 2,4-dichloro-6-[(1-octyloxy-2,2,6,6-tetramethylpiperidin-4-yl)butylamino]-s-triazine end-capped with 2-chloro-4,6-bis(dibutylamino)-s-triazine; an oligomeric compound that is a condensation product of 4,4'-hexamethylenebis(amino-2,2,6,6-tetramethylpiperidine) and 2,4-dichloro-6-[(1-cyclohexyloxy-2,2,6,6-tetramethylpiperidin-4-yl)butylamino]-s-triazine end-capped with 2-chloro-4,6-bis(dibutylamino)-s-triazine; 2,4-bis[(1-cyclohexyloxy-2,2,6,6-piperidin-4-yl)-6-chloro-s-triazine; a reaction product of peroxidized 4-butylamino-2,2,6,6-tetramethylpiperidine, 2,4,6-trichloro-s-triazine, cyclohexane, and N,N'-ethan-1,2-diylbis(1,3-propanediamine) (N,N',N'''-tris{2,4-bis[(1-cyclohexyloxy-2,2,6,6-tetramethylpiperidin-4-yl)n-butylamino]-s-triazin-6-yl}-3,3'-ethylenediiminodipropylamine); bis(1-undecanoxy-2,2,6,6-tetramethylpiperidin-4-yl)carbonate; 1-undecyloxy-2,2,6,6-tetramethylpiperidin-4-one; and bis(1-stearyloxy-2,2,6,6-tetramethylpiperidin-4-yl)carbonate. Examples of commercially available NOR hindered amine-based flame retardants include FlamestabNOR116FF, TINUVIN NOR371, TINUVIN XT850FF, TINUVIN XT855FF, and TINUVIN PA123 all available from BASF SE and LA-81 available from ADEKA Corporation.

Each of the flame retardants may be used alone or two or more thereof may be used in admixture.

The flame retardant may be contained in at least one of the base layer 1 or the top layer 2. In order to achieve effective improvement of the flame retardancy, the flame retardant is preferably contained in the top layer 2, which is an upper layer.

In the case where at least one of the base layer 1 or the top layer 2 contains the flame retardant, the amount of the flame retardant is preferably 3% by mass or more, more preferably 4.4% by mass or more based on 100% by mass of the total mass of the base layer 1 and the top layer 2.

The amount of the flame retardant is preferably 20% by mass or less, more preferably 15% by mass or less based on 100% by mass of the total mass of the base layer 1 and the top layer 2.

When the lower limit of the amount of the flame retardant is within the above range, the flame retardancy of the transparent resin film is further improved. When the upper limit of the amount of the flame retardant is within the above range, the transparency of the transparent resin film is further maintained.

The base layer 1 and the top layer 2 preferably contain a filler.

Any filler that does not impair the transparency of the base layer 1 and the top layer 2 may be used. In order to achieve still better sharpness (referring to visibility of a picture layer described later) of a decorative material including the transparent resin film 10, preferred is a filler having an average particle size not larger than the visible light wavelength. Examples of the filler include inorganic fillers such as silica, calcium carbonate, talc, and clay.

The filler is preferably contained in the same layer as the layer containing the flame retardant. In other words, at least one of the base layer 1 or the top layer 2 preferably contains the flame retardant and the filler.

In the case where at least one of the base layer 1 or the top layer 2 contains the flame retardant, the layer containing the flame retardant preferably further contain an inorganic filler having a polar group on its surface. When the layer containing the flame retardant further contains an inorganic filler having a polar group on its surface, the flame retardancy of the transparent resin film 10 and the sharpness of a decorative material including the transparent resin film 10 are further improved. A polar portion of the flame retardant is attracted to the polar group on the surface of the inorganic filler having a polar group. The presence of the flame retardant on the surface improves dispersibility, which presumably provides the above effect. Usable examples of the inorganic filler having a polar group on its surface include a hydrophilic inorganic filler such as an inorganic filler having a hydroxy group (e.g., silanol group) on its surface. More specifically, hydrophilic silica can be used.

The silica used as the filler may be either natural or synthetic, and may be either crystalline or amorphous. In the case of synthetic amorphous silica, it may be prepared by either a wet method or a dry method. Synthetic wet silica prepared by a wet method may be prepared by any method including a precipitation method and a gelling method. Synthetic dry silica prepared by a dry method may be prepared by any method including a combustion method and an arc method. The silica used preferably has a small average particle size in order to further improve the sharpness of a decorative material including the transparent resin film 10. More preferred is fumed silica or hydrophilic fumed silica obtainable by a combustion method.

The filler such as the hydrophilic fumed silica has a BET specific surface area of preferably 50 m$^2$/g or larger, more preferably 130 m$^2$/g or larger, still more preferably 200 m$^2$/g or larger. When the lower limit of the BET specific surface area of the filler is within the above range, the silica has a small average particle size and, in the case of hydrophilic fumed silica, the amount of silanol increases. As a result, reduction in transparency of the base layer 1 and the top layer 2 caused by addition of the filler is further reduced or prevented and the dispersibility of the flame retardant is further improved, which further improves the flame retardancy of the transparent resin film and the sharpness of a decorative material including the transparent resin film 10. When the lower limit of the BET specific surface area of the filler is within the above range, the flame retardancy of the transparent resin film is improved, which enables reduction of the amount of the flame retardant.

The BET specific surface area as used herein is determined by a nitrogen adsorption method in conformity with DIN 66131.

The hydrophilic fumed silica used as the filler may be a commercial product. Examples of the commercial product include AEROSIL 50, AEROSIL 130, AEROSIL 200, AEROSIL 300, and AEROSIL 380 all available from Nippon Aerosil Co., Ltd.

In the case where the base layer 1 and the top layer 2 contain the flame retardant and the filler, the amount of the filler in the base layer 1 and the top layer 2 is preferably 50 parts by mass or more, more preferably 100 parts by mass or more, still more preferably 200 parts by mass or more per 100 parts by mass of the flame retardant contained in the base layer 1 and the top layer 2. When the lower limit of the amount of the filler in the base layer 1 and the top layer 2 is within the above range, sharpness of a decorative material including the transparent resin film 10 is further improved. The amount of the filler in the base layer 1 and the top layer 2 is preferably 25 parts by mass or less, more preferably 20 parts by mass or less, still more preferably 10 parts by mass or less.

In order to achieve higher performance including heat resistance and shrinkage, the base layer 1 and the top layer 2 may further contain additives such as matting agents, blowing agents, lubricants, antistatic agents, antioxidants, ultraviolet absorbers, light stabilizers, radical scavengers, and soft components (e.g., rubber).

The base layer 1 and the top layer 2 may be subjected to surface treatment such as saponification treatment, glow discharge treatment, corona discharge treatment, plasma discharge treatment, ultraviolet (UV) treatment, or flame treatment, within a range of the gist of the present invention.

The base layer 1 and the top layer 2 may be directly laminated on each other by thermal lamination or the like.

Figure 2:
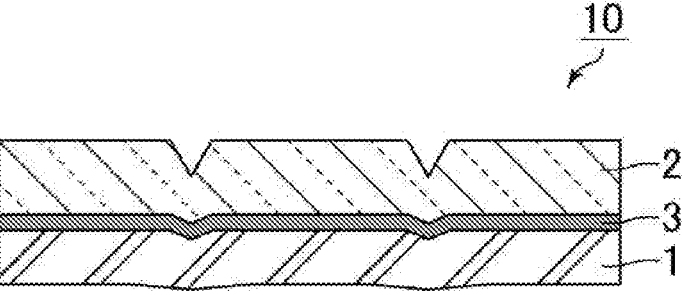
FIG. 2 is a cross-sectional view illustrating another embodiment of the transparent resin film of the present invention.

FIG. 2 is a cross-sectional view illustrating another embodiment of the transparent resin film of the present invention.

As illustrated in FIG. 2, the base layer 1 and the top layer 2 may be laminated on each other with a transparent adhesive layer 3 between them by a common method such as dry lamination.

The thermal lamination may be performed by a known method such as melt coextrusion using a T die.

(Transparent Adhesive Layer)

A known adhesive may be used as the transparent adhesive layer 3. Examples of the adhesive include polyurethanes, acrylic resins, polyolefins, polyvinyl acetates, polyvinyl chlorides, vinyl chloride-vinyl acetate copolymers, ethylene-acrylic acid copolymers, ionomers. The examples further include butadiene-acrylic nitrile rubber, neoprene rubber, and natural rubber. Each of these adhesives may be used alone or in combination of two or more.

The transparent adhesive layer 3 has a thickness of preferably about 0.1-30 μm, more preferably about 1-5 μm.

Figure 3:
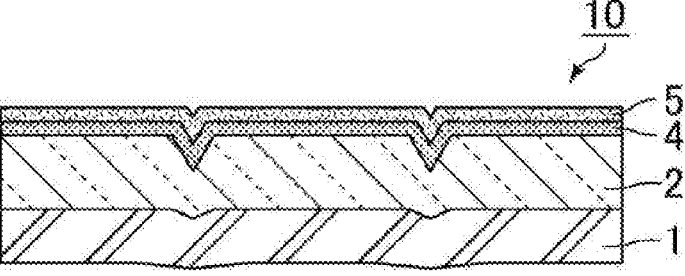
FIG. 3 is a cross-sectional view illustrating still another embodiment of the transparent resin film of the present invention.

FIG. 3 is a cross-sectional view illustrating still another embodiment of the transparent resin film of the present invention.

As illustrated in FIG. 3, the transparent resin film 10 may include, in addition to the above configuration, a surface protective layer 5 with a primer layer 4 between the base and top layers and the surface protective layer 5.

(Surface Protective Layer)

From the standpoint of imparting surface properties such as scratch resistance, abrasion resistance, water resistance, and contamination resistance, the transparent resin film 10 preferably includes the surface protective layer 5 on the side opposite to the side to be laminated on the substrate.

Resin contained in the surface protective layer preferably includes at least one curable resin such as a thermosetting resin and an ionizing radiation curable resin. In order to achieve high surface hardness, high productivity, high weather resistance, or the like, more preferred is an ionizing radiation curable resin.

The ionizing radiation curable resin may be any resin that undergoes crosslinking polymerization in response to irradiation with ionizing radiation to change its structure to a three-dimensional polymer structure.

For example, one or more of a prepolymer, oligomer, and monomer having a polymerizable unsaturated bond that is crosslinkable in response to irradiation with ionizing radiation or an epoxy group in the molecule. Examples thereof include acrylate resins such as urethane acrylate (e.g., bifunctional ether-based urethane oligomer, polyfunctional urethane oligomer), polyester acrylate, and epoxy acrylate; silicon resins such as siloxane; polyester resins; and epoxy resins.

Examples of the ionizing radiation include visible light, ultraviolet light (e.g., near ultraviolet light, vacuum ultraviolet light), X rays, electron beams, and ion beams. Among these, preferred are ultraviolet light and electron beams.

The ultraviolet light source used may be a light source such as an ultra-high pressure mercury lamp, a high-pressure mercury lamp, a low-pressure mercury lamp, a carbon-arc lamp, a black light fluorescent lamp, and a metal halide lamp. The wavelength of the ultraviolet light is about 190-380 nm, for example.

The electron beam source used may be an electron beam accelerator of any type such as Cockcroft-Walton type, Van de Graaff type, resonant transformer type, insulating core transformer type, linear type, Dynamitron type, or radio frequency type.

The electron beam preferably has an energy of about 100-1000 keV, more preferably about 100-300 keV. The electron beam dose is preferably 2-15 Mrad.

The ionizing radiation curable resin is sufficiently cured by irradiation with an electron beam. Still, in the case of curing by irradiation with ultraviolet light, a photopolymerization initiator (sensitizer) is preferably added.

The photopolymerization initiator used may be, in the case of a resin having a radical polymerizable unsaturated group, at least one selected from acetophenones, benzophenones, thioxanthones, benzoin, benzoin methyl ether, Michler-Benzoyl benzoate, Michler's ketone, diphenyl sulfide, dibenzyl disulfide, diethyl oxide, triphenyl biimidazole, and isopropyl-N,N-dimethylaminobenzoate.

In the case of a resin having a cationic polymerizable functional group, the photopolymerization initiator used may be at least one selected from aromatic diazonium salts, aromatic sulfonium salts, metallocene compounds, benzoin sulfonic acid esters, and furyloxy sulfoxonium diallyl iodosyl salts.

The amount of the photopolymerization initiator is not limited, and is about 0.1-10 parts by mass per 100 parts by mass of the ionizing radiation curable resin, for example.

A surface protective layer may be formed from the ionizing radiation curable resin by applying a solution of the ionizing radiation curable resin by an application method such as gravure coating or roll coating.

Examples of the thermosetting resin include unsaturated polyester resins, polyurethane resins (including two-component curable polyurethanes), epoxy resins, aminoalkyd resins, phenolic resins, urea resins, diallylphthalate resins, melamine resins, guanamine resins, melamine-urea cocondensated resins, silicon resins, and polysiloxane resins.

To the thermosetting resin may be added curing agents and polymerization accelerators such as crosslinking agents and polymerization initiators. For example, to an unsaturated polyester resin or polyurethane resin may be added an isocyanate or an organic sulfonic acid salt as a curing agent. To an epoxy resin may be added an organic amine or the like. To an unsaturated polyester resin may be added a radical initiator such as a peroxide (e.g., methyl ethyl ketone peroxide) or azoisobutyl nitrile.

A surface protective layer may be formed from the thermosetting resin, for example, by applying a solution of the thermosetting resin by an application method such as roll coating or gravure coating, followed by drying and curing.

The surface protective layer 5 has a thickness of preferably 0.1-50 μm, more preferably 1-20 μm.

In order to additionally impart scratch resistance and abrasion resistance to the surface protective layer 5, an inorganic filler may be added. Examples of the inorganic filler include powders of aluminum oxide, silicon carbide, silicon dioxide, calcium titanate, barium titanate, magnesium pyroborate, zinc oxide, silicon nitride, zirconium oxide, chromium oxide, iron oxide, boron nitride, diamond, emery, talc, and glass fiber.

The surface protective layer 5 may contain silica, acrylic beads, or the like for gloss adjustment or tactile feel adjustment.

The amount of the inorganic filler is about 1-80 parts by mass per 100 parts by mass of the ionizing radiation curable resin.

In order to achieve higher flame retardancy, the surface protective layer 5 preferably contains the flame retardant mentioned for the top layer 1 and the base layer 2.

The flame retardant contained in the surface protective layer 5 exhibits functions such as formation of char or capture of radicals in combustion gas in response to heat applied from the surface during combustion, thereby reducing flammability.

The lower limit of the amount of the flame retardant in the surface protective layer 5 is preferably 3% by mass or more, more preferably 4.4% by mass or more based on 100% of the total mass of the surface protective layer 5. The upper limit of the amount of the flame retardant is preferably 20% by mass or less, more preferably 15% by mass or less.

From the standpoint of improving the flame retardancy while maintaining the sharpness of a decorative material including the transparent resin film 10, the surface protective layer 5 preferably contains the flame retardant and the inorganic filler.

The inorganic filler used may be the inorganic filler mentioned above or appropriately selected from those mentioned for the top layer 1 and the base layer 2. The inorganic filler is preferably silica, more preferably fumed silica in consideration of the dispersibility of the flame retardant, still more preferably a hydrophilic fumed silica among the fumed silica.

(Primer Layer)

The primer layer 4 can be formed by application of a known primer agent. Examples of the primer agent include urethane resin-based primer agents containing acrylic-modified urethane resins (acrylic urethane-based resins), primer agents containing urethane-cellulose-based resins (e.g., resin obtained by adding hexamethylene diisocyanate to a mixture of urethane and nitrocellulose), and resin-based primer agents containing acrylic-urethane block copolymers. To the primer agent may be optionally added additives. Examples of the additives include fillers such as calcium carbonate or clay, flame retardants such as magnesium hydroxide, antioxidants, lubricants, blowing agents, ultraviolet absorbers, and light stabilizers. The amounts of the additives may be appropriately determined in accordance with the product characteristics.

The primer layer 4 may have any thickness. For example, the thickness is preferably 0.01-10 μm, more preferably 0.1-3 μm.

(A Pattern of Protrusions and Depressions)

The transparent resin film 10 has a pattern of protrusions and depressions on the side opposite to the side to be laminated on the substrate.

The pattern of protrusions and depressions on the side opposite to the side to be laminated on the substrate has a maximum height Rz defined in JIS B 0601(2001) of preferably 20 μm or more and 200 μm or less, more preferably 50 μm or more and 180 μm or less.

The presence of such a pattern of protrusions and depressions can suitably impart characteristics such as a design and slip resistance.

The transparent resin film 10 has a maximum height Rz defined in JIS B 0601 (2001) on the side to be laminated on the substrate of 80 μm or less, more preferably 50 μm or less, still more preferably 25 μm or less.

The presence of such a pattern of protrusions and depressions allows the base layer 1 to be softened even in thermal lamination at low temperature to suitably follow the substrate, thereby suitably reducing or preventing air entrainment.

The maximum height (Rz) can be determined by the measurement using a surface profilometer ("SURFCOM-FLEX-50A", available from Tokyo Seimitsu Co., Ltd.) under the following conditions.

(Measurement Condition)

Number of measurements: n=5 (at any five points)
Standard for calculation: JIS'01
Measurement type: roughness measurement
Evaluation length: 12.5 mm
Cut-off value: 2.5 mm
Measurement speed: 0.60 mm/s
Filter type: Gaussian filter
Form elimination: straight line
λs value: 8.0 μm In the case of a directional pattern of protrusions and depressions such as a wood-grain vessel pattern or a hairline pattern, the measurement is performed in the flow direction and in a direction perpendicular to the flow direction, and the layer measurement value is taken as the maximum height (Rz).

A part where the pattern of protrusions and depressions is provided is selected as the measurement site in the measurement.

The pattern of protrusions and depressions on the side opposite to the side to be laminated on the substrate may be formed by any method. Examples of the method include thermal embossing and transferring of a pattern of protrusions and depressions using a shape-forming sheet to the side opposite to the side to be laminated on the substrate side of the transparent resin film 10.

Thermal embossing may be performed, for example, using a known sheet- or rotary embosser. For example, a pattern of protrusions and depressions may be transferred under the conditions of a sheet temperature of 120° C.-160° C. and a pressure of 1.0-4.0 MPa.

Embossing on the transparent resin film 10 may be performed before or after formation of the surface protective layer. The top layer 2 may be subjected to embossing before being laminated on the base layer 1.

The following methods may be exemplified.

In an exemplary method 1), after sequential formation of the base layer 1 and the top layer 2, the surface protective layer is formed, and embossing is finally performed. In another exemplary method 2), after sequential formation of the base layer 1 and the top layer 2, embossing is performed, and the surface protective layer is finally formed. In still another exemplary method 3), sequential formation of the base layer 1 and the top layer 2 and embossing are performed at the same time, and the surface protective layer is finally formed.

The transparent resin film 10 may be produced by any method. Examples of the method include lamination of the above-described layers with a layer such as the transparent adhesive layer or the primer layer.

<Decorative Material>

The present invention also relates to a decorative material including a substrate including a picture layer and the transparent resin film 10 laminated on the substrate.

Figure 4:
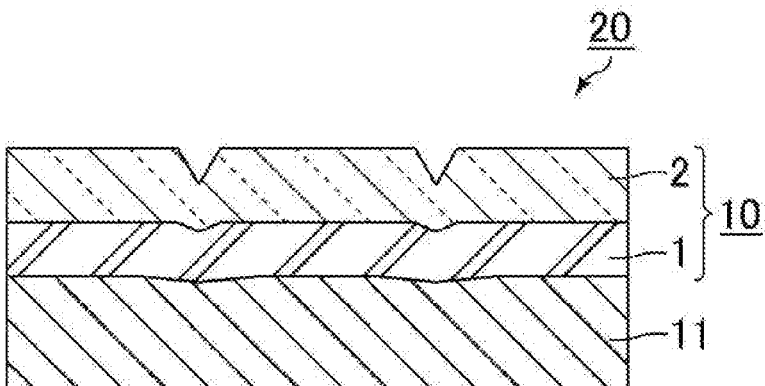
FIG. 4 is a cross-sectional view illustrating an embodiment of the decorative material of the present invention.

FIG. 4 is a cross-sectional view illustrating an embodiment of the decorative material of the present invention.

As illustrated in FIG. 4, a decorative material 20 of the present invention has a structure in which the transparent resin film 10 is laminated on a substrate 11 including a picture layer. The transparent resin film 10 preferably includes the base layer 1 having one side to be laminated on the substrate 11 and the top layer 2 facing the other side of the base layer 1.

The substrate 11 including a picture layer (hereafter, simply referred to as substrate 11) includes, for example, a substrate sheet and a picture layer.

The substrate 11 may also be a decorative board including a support described later and a picture layer or an adherend including a picture layer described later.

Specifically, the decorative material 20 of the present invention, for example, has a structure (1) in which at least a substrate sheet, a picture layer, and the transparent resin film 10 are sequentially laminated on each other in the thickness direction, a structure (2) in which at least a decorative board including a support and a picture layer and the transparent resin film 10 are sequentially laminated on each other in the thickness direction, or a structure (3) in which at least an adherend including a picture layer and the transparent resin film 10 are sequentially laminated on each other in the thickness direction.

Hereafter, the substrate 11 constituting the decorative material 20 of the present invention is specifically described.

(Substrate Sheet)

The substrate sheet is not limited, and preferably contains a thermoplastic resin.

Examples of the thermoplastic resin include: olefin-based thermoplastic resins such as low-density polyethylene (including linear low-density polyethylene), medium-density polyethylene, high-density polyethylene, ethylene-α olefin copolymers, homopolypropylene, polymethylpentene, polybutene, ethylene-propylene copolymers, propylene-butene copolymers, ethylene-vinyl acetate copolymers, saponified ethylene-vinyl acetate copolymers, or mixtures of these; thermoplastic ester-based resins such as polyethylene terephthalate, polybutylene terephthalate, polyethylene naphthalate, polyethylene naphthalate-isophthalate copolymers, polycarbonate, or polyarylate; acrylic thermoplastic resins such as polymethyl methacrylate, polyethyl methacrylate, polyethyl acrylate, or polybutyl acrylate; polyamide-based thermoplastic resins such as Nylon 6 or Nylon 66; polyimides; polyurethanes; polystyrenes; acrylonitrile-butadiene-styrene resins; diene-based rubbers such as styrene butadiene rubber, polyisoprene rubber, and chloroprene rubber;

non-diene-based rubbers such as butyl rubber and ethylene propylene rubber; natural rubber; thermoplastic elastomers; and polyvinyl chloride.

Each of these thermoplastic resins may be used alone or two or more thereof may be used in admixture. In particular, olefin-based thermoplastic resins are preferred because they have excellent printability of a picture layer and are inexpensive.

The substrate sheet may be colored. In that case, colorants (pigments or dyes) may be added to the thermoplastic resin described above for coloring. Usable examples of the colorants include inorganic pigments such as titanium dioxide, carbon black, and iron oxide and organic pigments such as phthalocyanine blue, as well as various dyes. One or two or more colorants may be selected from known or commercial colorants. The amounts of the colorants may be appropriately determined in accordance with the desired coloration or the like.

The substrate sheet preferably contains a flame retardant described above for the same reason as that for the base layer 1, the top layer 2, and the surface protective layer 5.

Examples of the flame retardant include phosphinic acid metal salt-based flame retardants, phosphazene-based flame retardants, NOR hindered amine-based flame retardants, halogen-based flame retardants, antimony-based flame retardants, metal hydroxide-based flame retardants, and phosphoric acid ester-based flame retardants. From the environmental standpoint and the standpoint of reducing the amount added for maintaining the transparency of the layer containing the flame retardant, preferred is at least one selected from the group consisting of phosphinic acid metal salt-based flame retardants, phosphazene-based flame retardants, and NOR hindered amine-based flame retardants. From the standpoint of achieving an effect of suppressing flame spread in a horizontal flammability test, preferred is at least one selected from the group consisting of the phosphinic acid metal salt-based flame retardants and the phosphazene-based flame retardants. From the standpoint of achieving an effect of reducing the calorific value in the flammability test in accordance with ISO 5660-1, preferred is a NOR hindered amine-based flame retardant.

The phosphinic acid metal salt-based flame retardant, the phosphazene-based flame retardant, or the NOR hindered amine-based flame retardant used can be appropriately selected from those mentioned for the base layer 1 and the top layer 2.

In the case where the substrate sheet contains the flame retardant, the amount of the flame retardant is preferably 5 parts by mass or more, more preferably 7.5 parts by mass or more based on 100 parts by mass of at least one selected from thermoplastic resins in the substrate sheet. The amount of the flame retardant in the substrate sheet is preferably 30 parts by mass or less, more preferably 20 parts by mass or less. When the lower limit of the amount of the flame retardant in the substrate sheet is within the above range, the flame retardancy of the transparent resin film is further improved. When the upper limit of the amount of the flame retardant in the substrate sheet is within the above range, the substrate sheet shows further excellent strength.

The substrate sheet may optionally contain additives such as fillers, matting agents, blowing agents, lubricants, antistatic agents, antioxidants, ultraviolet absorbers, and light stabilizers.

The substrate sheet may have any thickness. Still, the thickness is preferably about 40 µm or larger and 20 mm or smaller.

The substrate sheet may have either a single layer structure or a multilayer structure.

In the case where the substrate sheet has a small thickness of 1 mm or less, an adherend described later may be provided on the rear face of the substrate sheet.
(Picture Layer)

The picture layer provides a desired picture (design). The type or the like of the picture is not limited. Examples of the picture include wood-grain patterns, leather patterns, stone grain patterns, grain patterns, tiled patterns, brick-masonry patterns, fabric patterns, geometrical patterns, letters, signs, abstract patterns, floral patterns, landscapes, and mascot characters.

The picture layer may be provided at any site including on the side on which the transparent resin film 10 is laminated of the substrate 11, between the layers included in the substrate 11 (inside the substrate 11), and on the side opposite to the side on which the transparent resin film 10 is laminated of the substrate 11.

The picture layer may be formed by any method. For example, the picture layer may be formed at any site of the substrate 11 such as on the substrate sheet (on the front side) by a known printing method using ink prepared by dissolving (or dispersing) known colorants (dyes or pigments) with a binder resin in a solvent (or a dispersing medium). The substrate 11 may be partly or entirely colored and the binder resin may include a mixture of multiple resins.

From the standpoint of reducing VOC from the decorative material, the ink used may be an aqueous composition.

Examples of the colorants include: inorganic pigments such as carbon black, titanium white, zinc oxide, red iron oxide, ultramarine, and cadmium red; organic pigments such as azo pigments, lake pigments, anthraquinone pigments, quinacridone pigments, phthalocyanine pigments, iso-indolinone pigments, and dioxazine pigments; metallic powder pigments such as aluminum powder and bronze powder; pearl gloss pigments such as titanium oxide-coated mica and bismuth chloride oxide; fluorescent pigments; and luminous pigments. Each of these colorants may be used alone or in combination of two or more. These colorants may be used together with additives such as a filler (e.g., silica), an extender pigment (e.g., organic beads), a neutralizer, or a surfactant.

In addition to hydrophilized polyester-based urethane resins, the binder resin may also include different resins such as polyester, polyacrylate, polyvinyl acetate, polybutadiene, polyvinyl chloride, chlorinated polypropylene, polyethylene, polystyrene, polystyrene-acrylate copolymers, rosin derivatives, adducts of alcohols with styrene-maleic anhydride copolymers, and cellulose-based resins. More specific examples thereof include: polyacrylamide-based resins, poly(meth)acrylic acid-based resins, polyethylene oxide-based resins, poly(N-vinyl pyrrolidone)-based resins, water-soluble polyester-based resins, water-soluble polyamide-based resins, water-soluble amino-based resins, water-soluble phenolic resins, and other water-soluble synthetic resins; and water-soluble natural polymers such as polynucleotides, polypeptides, and polysaccharides. Usable examples further include modified products of natural rubber, synthetic rubber, polyvinyl acetate-based resins, (meth)acrylic resins, polyvinyl chloride resins, and polyurethane-polyacrylic resins, mixtures of these materials including natural rubber, and other resins. Each of these binder resins may be used alone or in combination of two or more.

Examples of the solvent (or a dispersion medium) include: petroleum-based organic solvents such as hexane, heptane, octane, toluene, xylene, ethyl benzene, cyclohexane, and methyl cyclohexane; ester-based organic solvents such as ethyl acetate, butyl acetate, 2-methoxyethyl acetate, and 2-ethoxyethyl acetate; alcohol-based organic solvents such as methyl alcohol, ethyl alcohol, n-propyl alcohol, isopropyl alcohol, isobutyl alcohol, ethylene glycol, and propylene glycol; ketone-based organic solvents such as acetone, methyl ethyl ketone, methyl isobutyl ketone, and cyclohexanone; ether-based organic solvents such as diethyl ether, dioxane, and tetrahydrofuran; chlorine-based organic solvents such as dichloromethane, carbon tetrachloride, trichloroethylene, and tetrachloroethylene; and inorganic solvents such as water. Each of these solvents (or dispersion media) may be used alone or in combination of two or more.

Examples of the printing method used for formation of the picture layer include gravure printing, offset printing, screen printing, flexographic printing, electrostatic printing, and ink-jet printing. Examples of the method for forming an overall solid picture layer include various coating methods such as roll coating, knife coating, air knife coating, die coating, lip coating, comma coating, kiss coating, flow coating, and dip coating. Examples of the method for forming the picture layer further include hand-painting, marbling, photographing, transferring, laser beam drawing, electron beam drawing, partial vapor deposition of metal or the like, and etching. These methods may be combined with different methods.

The picture layer may have any thickness. The thickness may be appropriately determined in accordance with the product characteristics. Still, the thickness is about 0.1-15 μm.

The substrate 11 of the present invention may further include a transparent adhesive layer, a primer layer, a backer layer, or the like, if needed. In such a case, an adherent may be provided on a rear side of the transparent adhesive layer, the primer layer, the backer layer, or the like.

The transparent adhesive layer and the primer layer each may be a layer similar to the layer described for the transparent resin film 10.

(Backer Layer)

Examples of the backer layer include resin backer layers such as synthetic resin backer layers and foamed resin backer layers, wood-based backer layers formed of cork or the like, and nonwoven fabric-based backer layers. The backer layer is preferably provided as the lowermost layer (on the side opposite to the side on which the transparent resin film 10 is laminated) of the substrate 11.

When the substrate 11 includes the backer layer, the decorative material can have further excellent scratch resistance and impact resistance.

Examples of the resin contained in the synthetic resin backer layer include polypropylene, ethylene-vinyl alcohol copolymers, polyethylene, polymethylpentene, polyethylene terephthalate, high heat resistant polyalkylene terephthalate (e.g., PET-G (trade name, available from Eastman Chemical Company), which is polyethylene terephthalate obtained by substituting part of ethylene glycol with 1,4-cyclohexane dimethanol, diethylene glycol, or the like), polybutylene terephthalate, polyethylene naphthalate, polyethylene naphthalate-isophthalate copolymers, amorphous polyester (A-PET), polycarbonate, polyarylate, polyimide, polystyrene, polyamide, ABS, diene rubbers such as styrene butadiene rubber, isoprene rubber, or chloroprene rubber, non-diene rubbers such as butyl rubber or ethylene propylene rubber, natural rubber, and thermoplastic elastomers. Each of these resins may be used alone or in combination of two or more.

The synthetic resin backer layer may contain hollow beads.

The type, particle size, and amount of the hollow beads may be those described in JP 2014-188941 A.

The synthetic resin backer layer may contain a flame retardant for the same reason as that for the base layer 1 and the top layer 2.

Examples of the flame retardant include phosphinic acid metal salt-based flame retardants, phosphazene-based flame retardants, NOR hindered amine-based flame retardants, halogen-based flame retardants, antimony-based flame retardants, metal hydroxide-based flame retardants, and phosphoric acid ester-based flame retardants. From the environmental standpoint and the standpoint of reducing the amount added for maintaining the transparency of the layer containing the flame retardant, preferred is at least one selected from the group consisting of phosphinic acid metal salt-based flame retardants, phosphazene-based flame retardants, and NOR hindered amine-based flame retardants. From the standpoint of achieving an effect of suppressing flame spread in a horizontal flammability test, preferred is at least one selected from the group consisting of phosphinic acid metal salt-based flame retardants and phosphazene-based flame retardants. From the standpoint of achieving an effect of reducing the calorific value in the flammability test in accordance with ISO 5660-1, preferred is a NOR hindered amine flame retardant.

In the case where the synthetic resin backer layer contains the flame retardant, the amount of the flame retardant in the synthetic resin backer layer is preferably 5% by mass or more, more preferably 7.5% by mass or more based on 100% by mass of the resin in the synthetic resin backer layer. The amount of the flame retardant in the synthetic resin backer layer is preferably 30% by mass or less, more preferably 20% by mass or less. When the lower limit of the amount of the flame retardant in the synthetic resin backer layer is within the above range, the flame retardancy of a decorative material is further improved. When the upper limit of the amount of the flame retardant in the synthetic resin backer layer is within the above range, the synthetic resin backer layer shows further excellent strength.

The synthetic resin backer layer may have any thickness. The thickness is, for example, preferably 100-600 μm, more preferably 150-450 μm.

Examples of the method for forming the synthetic resin backer layer include calendering and extrusion molding of a molten resin. In particular, extrusion molding of a molten resin is suitable. For example, extrusion molding using a T-die is more suitable.

The foamed resin backer layer may be provided as a layer below the synthetic resin backer layer (on the side opposite to the side having a pattern of protrusions and depressions).

The foamed resin backer layer may be a layer described in JP 2014-188941 A.

<Decorative Board>

The decorative material 20 of the present invention may have a structure including at least a decorative board including a support and a picture layer as a substrate, and the transparent resin film 10 laminated on each other sequentially in the thickness direction, for example, provided that the decorative board can be thermally laminated on the transparent resin film 10.

In this case, the substrate 11 preferably includes at least a support and a picture layer.

The picture layer is suitably the picture layer described above.

(Support)

The support is not limited, and may be appropriately selected from various paper materials, plastic films, woody boards such as lumber, and ceramic materials in accordance with the application. Each of these materials may be used alone. Alternatively, any combination of materials may be formed into a laminate, such as a complex of paper materials or a complex of a paper material and a plastic film.

Examples of the paper materials include tissue paper, kraft paper, and titanium paper. These paper substrates may contain resins such as acrylic resins, styrene butadiene rubber, melamine resins, or urethane resins (by immersion in a resin after papermaking, or filling upon papermaking) for the purpose of increasing the interfiber strength of the paper substrate or the interlayer strength between the paper substrate and another layer and preventing dusting. Examples thereof include interpaper reinforced paper and resin-impregnated paper.

Examples of the paper materials also include various paper materials often used in the building material field such as cotton linter paper, cardboard, base paper for plaster board, and raw webs of vinyl wallpaper which is a paper material provided with a vinyl chloride layer on the surface.

The examples further include those often used in the paperwork field, typical printing, and packaging, such as coated paper, art paper, sulfate paper, glassine paper, parchment paper, paraffin paper, and Japanese paper. Though they are distinguished from these paper materials, woven fabrics or nonwoven fabrics of various fibers having an appearance and characteristics similar to those of paper are also usable as substrates. Examples of the various fibers include inorganic fibers such as glass fiber, asbestos fiber, potassium titanate fiber, alumina fiber, silica fiber, and carbon fiber and synthetic resin fibers such as polyester fiber, acrylic fiber, and vinylon fiber.

In the case where the support such as paper materials is a porous substrate and the porous substrate is impregnated with a thermosetting resin, conventionally known thermosetting resins are widely usable. Examples of the thermosetting resins include unsaturated polyester resins, polyurethane resins (including two-component curable polyurethanes), epoxy resins, aminoalkyd resins, phenolic resins, urea resins, diallylphthalate resins, melamine resins, guanamine resins, melamine-urea cocondensated resins, silicon resins, and polysiloxane resins.

A layer obtained by impregnating a paper material with a thermosetting resin and curing the resin is also referred to as a thermosetting resin layer. In some cases, the thermosetting resin layer finally serves as a surface protective layer.

The porous substrate is impregnated with any of the thermosetting resins by supplying the thermosetting resin from one or both of the front and rear sides of the porous substrate. Any method may be employed for the impregnation and examples include: immersion of a mold release layer side surface or the opposite side surface of the porous substrate in a thermosetting resin bath; application of a thermosetting resin to the mold release layer side surface, the opposite side surface, or both surfaces of the porous substrate using a coater such as a kiss coater or a comma coater; and spraying of a thermosetting resin to the mold release layer side surface, the opposite side surface, or both surfaces of the porous substrate using a device such as a spray device or a shower device.

Specific examples of the resin contained in the plastic films include polyolefin resins (e.g., polyethylene, polypropylene), vinyl resins (e.g., vinyl chloride resin, vinylidene chloride resin, phenolic resin, polyvinyl alcohol, ethylene-vinyl alcohol copolymer); polyester resins (e.g., polyethylene terephthalate, polybutylene terephthalate), acrylic resins (e.g., polymethyl methacrylate, polymethyl acrylate, polyethyl methacrylate), polystyrene, acrylonitrile-butadiene-styrene copolymers (ABS resins), cellulose triacetate, and polycarbonate. Among these, preferred are polyolefin resins, vinyl chloride resins, polyester resins, and acrylic resins from the standpoint of physical properties such as weather resistance and water resistance, printability, molding processability, cost, and the like.

The support may contain the flame retardant mentioned above. The support containing the flame retardant can contribute to further improvement of the flame retardancy of the decorative board for the same reason as for the top layer 1, the base layer 2, and the surface protective layer 5. The flame retardant that can be contained in the support is preferably the same as one used in the top layer 1, the base layer 2, and the like.

The support may have any thickness. In the case where the support is a plastic film, the thickness is preferably 20-200 μm, more preferably 40-160 μm, still more preferably 40-100 μm.

In the case where the support is a paper material, the basis weight is typically preferably 20-150 g/m$^2$, more preferably 30-100 g/m$^2$.

The shape of the support is not limited to a flat plate shape, and may be a special shape such as a three-dimensional shape.

For the purpose of improving adhesion between the support and a layer provided on the support, one surface or both surfaces of the support may be subjected to adhesion enhancing treatment such as physical treatment or chemical surface treatment.

(Phenolic Resin Impregnated Paper)

The decorative board may include a phenolic resin impregnated paper, if needed.

The phenolic resin impregnated paper may be provided on the surface on the side opposite to the side on which an abrasion resistance layer and a mold release layer are formed of the porous substrate.

The phenolic resin impregnated paper is typically produced by impregnating kraft paper having a basis weight of about 150-250 g/m$^2$, as core paper, with a phenolic resin to a degree of impregnation of about 45-60% and drying the resulting paper at about 100-140° C. The phenolic resin impregnated paper used may be a commercial product. In the case of using a phenolic resin impregnated paper, the rear surface of the porous substrate may be subjected to corona discharge treatment or a rear primer layer may be formed by applying the primer layer described above on the rear surface of the porous substrate, if needed.

(Sealer Layer)

In the case where the support is a substrate having impregnation properties such as a paper material, a sealer layer may be provided between the support and the picture layer.

The sealer layer preferably contains a cured product of a curable resin composition such as a thermosetting resin composition or an ionizing radiation-curable resin composition, more preferably a cured product of a thermosetting resin composition.

The amount of the cured product of the curable resin composition in the total solid content of the sealer layer is preferably 50% by mass or more, more preferably 65-95% by mass.

Examples of the thermosetting resin composition and the ionizing radiation-curable resin composition for the sealer layer include those exemplified for the surface protective layer. The thermosetting resin composition is preferably a two-component curable resin containing a polyol and an isocyanate, more preferably a two-component curable resin containing an acrylic polyol and hexamethylene diisocyanate.

The sealer layer preferably contains particles from the standpoint of drying suitability and viscosity adjustment. The amount of the particles in the total solid content of the sealer layer is preferably 5-50% by mass, more preferably 5-35% by mass.

Examples of the particles in the sealer layer include those exemplified for the surface protective layer. The particles are preferably inorganic particles. Among the inorganic particles, silica particles are preferred.

The particles have an average particle size of preferably 0.1-2.0 μm, more preferably 0.2-1.5 μm.

The sealer layer has a thickness of preferably 0.5-5 μm, more preferably 1-3 μm from the standpoint of the balance between impregnation prevention and cost-effectiveness.

The substrate 11 may be produced by any method. An example of the method is laminating the above layers with a layer such as the transparent adhesive layer or the primer layer therebetween.

(Method for Producing Decorative Material)

The present invention also encompasses a method for producing a decorative material including laminating the transparent resin film 10 on the substrate 11 including a picture layer at a temperature of 100° C. or higher and 130° C. or lower.

In the case of using thermal lamination in the method for producing the decorative material 20 of the present invention, a common method may be appropriately employed. For example, since lamination in a heat-melting method or a thermal lamination method herein is performed at 100° C. or higher and 130° C. or lower, a loss of the pattern of protrusions and depressions formed on the transparent resin film 10 due to heat upon lamination can be reduced or prevented.

Thermal lamination is more preferably performed at a temperature of 110° C. or higher and 120° C. or lower.

A common thermal lamination method may be appropriately employed.

Examples of the method for producing the decorative material 20 of the present invention include a heat-melting method, a thermal lamination method, and a method of laminating the substrate 11 and the transparent resin film 10 using an adhesive such as an aqueous adhesive, a heat-sensitive adhesive, a pressure-sensitive adhesive, a hot melt adhesive, or an adhesive forming the transparent adhesive layer described above.

In particular, the method is preferably a method for producing a decorative material including the substrate 11 including a picture layer and the transparent resin film 10 of the present invention sequentially, the method including: forming a transparent adhesive layer on a side to be laminated on the picture layer of the transparent resin film 10; and bonding the transparent resin film 10 and the picture layer with the transparent adhesive layer. The present invention also encompasses such a method for producing the decorative material 20 of the present invention.

In the case of the transparent resin film 10, the pattern of protrusions and depressions is formed on the side opposite to the side to be laminated on the picture layer by embossing or the like. At this time, a bit of a pattern of protrusions and depressions corresponding to the pattern of protrusions and depressions on the embossed side is unintendedly formed on the surface on the side (side to be laminated on the picture layer) opposite to the surface subjected to embossing. In such a case, air entrainment, i.e., a phenomenon that air enters into the pattern of protrusions and depressions on the side to be laminated on the picture layer of the transparent resin film, may occur to lower the design quality.

Since the method for producing the decorative material 20 of the present invention includes a step of forming a transparent adhesive layer on the side to be laminated on the picture layer of the transparent resin film 10, the transparent adhesive layer is provided even at a depression of the pattern of protrusions and depressions on the side to be laminated on the picture layer, the air entrainment can be prevented, thereby suppressing impairment of the design quality.

The decorative material 20 of the present invention may have any thickness. The thickness is, for example, preferably 0.05 mm or more, more preferably 1 mm or more and 50 mm or less.

<Adherend>

The decorative material 20 of the present invention may be laminated on an adherend in a manner that the surface on the side opposite to the side having a pattern of protrusions and depressions is in contact with the adherend.

In the case where an adherend including the picture layer is used, the decorative material 20 of the present invention can be obtained by providing the transparent resin film 10 on the adherend having the picture layer. The picture layer is suitably the picture layer described above.

Examples of the material of the adherend include wood sheets such as wood single panels, plywood panels, particle boards, medium-density fiberboards (MDF), and high-density fiberboard (HDF); plaster-based sheets such as plaster sheets and plaster slag sheets; cement sheets such as calcium silicate sheets, asbestos slate sheets, cellular lightweight concrete sheets, and hollow extruded cement sheets; fiber cement sheets such as pulp cement sheets, asbestos cement sheets, and wood chip cement sheets; ceramic sheets such as pottery sheets, porcelain sheets, earthenware sheets, glass sheets, and enamel sheets; metallic sheets such as iron sheets, galvanized steel sheets, polyvinyl chloride sol-coated steel sheets, aluminum sheets, and copper sheets; thermoplastic resin sheets such as polyolefin resin sheets, acrylic resin sheets, ABS sheets, polycarbonate sheets, and polyvinyl chloride resin sheets; thermosetting resin sheets such as phenolic resin sheets, urea resin sheets, unsaturated polyester resin sheets, polyurethane resin sheets, epoxy resin sheets, and melamine resin sheets; and complex materials obtained by curing various fiber substrates (e.g., glass fiber nonwoven fabric, woven fabric, paper) impregnated with resins (e.g., phenolic resins, urea resins, unsaturated polyester resins, polyurethane resins, epoxy resins, melamine resins, diallylphthalate resins), i.e., FRP sheets. Each of these materials may be used alone as a substrate or two or more of these may be laminated to be used as a complex substrate.

The adherend may have any thickness.

Moreover, the thermoplastic resin sheets or the thermosetting resin sheets may contain, if needed, additives such as colorants (pigments or dyes), fillers such as wood flour or calcium carbonate, matting agents such as silica, blowing agents, flame retardants, lubricants such as talc, antistatic agents, antioxidants, ultraviolet absorbers, or light stabilizers.

Lamination to the adherend may be carried out by any method. Examples of the method include lamination using the primer layer described above or lamination using an adhesive.

The adhesive may be appropriately selected from known additives in accordance with the type of the adherend or the like. Examples of the adhesive include polyvinyl acetate, urethane resins, acrylic resins, urethane-acrylic resins (including copolymers), polyvinyl chloride, vinyl chloride-vinyl acetate copolymers, ethylene-acrylic acid copolymers, and ionomers. The examples further include butadiene-acrylonitrile rubber, neoprene rubber, and natural rubber.

The transparent resin film 10 of the present invention has excellent embossability and is capable of reducing or preventing air entrainment to provide high design quality.

The decorative material 20 including the transparent resin film 10 of the present invention is suitably usable for, for example, interior materials for walls, ceilings, floors, and the like of buildings; joinery such as window frames, doors, and handrails; furniture; casings for household appliances, OA equipment, and the like; and exterior materials for front doors and the like.

EXAMPLES

The present invention is more specifically described with reference to, but not limited to, examples hereinbelow.

Example 1

A polypropylene-based resin (thickness of 60 μm, softening temperature of 110° C.) was provided as a base layer. To one surface of the base layer was applied a two-component curable polyester resin adhesive containing isocyanate as a curing agent (to a thickness of 3 μm), whereby a transparent adhesive layer was formed. Next, a polypropylene-based resin (thickness of 60 μm, softening temperature of 150° C.) was provided as a top layer. The top layer was laminated on the transparent adhesive layer by dry lamination.

The surface of the top layer was subjected to corona treatment. To the treated surface was applied a primer agent (to a thickness of 2 μm). To the resulting surface was applied an ionizing radiation-curable resin (application amount of 15 μm) by gravure coating. The applied resin was irradiated with an electron beam using an electron irradiation device under the conditions of an accelerating voltage of 165 keV and 5 Mrad. Thus, a surface protective layer was formed.

After heating of the surface protective layer side with a contactless infrared heater to soften the base layer and the top layer, the surface was immediately subjected to hot press embossing. Thus, a transparent resin film having a pattern of protrusions and depressions was obtained.

At this time, the maximum height Rz on the rear face (side to be laminated on the substrate including a picture layer) of the transparent resin film was 25 μm.

Next, a substrate (mainly containing a resin mixture of polypropylene and polyethylene, thickness of 5 mm) including a picture layer on one side provided by printing using an inkjet printer to a thickness of 2 μm was provided. The transparent resin film was thermally laminated on the substrate at low temperature (120° C.) in such a manner that the base layer side of the transparent resin film was in contact with the picture layer side of the substrate. Thus, a decorative material was produced.

Example 2

A decorative material was produced as in Example 1, except that the top layer used was a polypropylene-based resin having a softening temperature of 130° C.

Example 3

A decorative material was produced as in Example 1, except that the base layer used was a polypropylene-based resin having a softening temperature of 150° C. and the top layer used was a polypropylene-based resin having a softening temperature of 160° C.

Example 4

A decorative material was produced as in Example 1, except that the embossing plate used in the embossing was changed to change the maximum height Rz on the rear face of the transparent resin film to 80 μm.

Example 5

A decorative material was produced as in Example 1, except that the embossing plate used in the embossing was changed to change the maximum height Rz on the rear face of the transparent resin film to 100 μm.

Example 6

A decorative material was produced as in Example 1, except that the top layer used was a polypropylene-based resin (thickness of 60 μm, softening temperature of 150° C.) containing a flame retardant (phosphinic acid metal salt-based flame retardant, product name: Pekoflam STC, available from Archroma, amount based on the total mass of the base layer and the top layer: 4.4% by mass) and the top layer was laminated on the transparent adhesive layer by dry lamination.

Example 7

A decorative material was produced as in Example 1, except that the top layer used was a polypropylene-based resin (thickness of 60 μm, softening temperature of 150° C.) containing a flame retardant (phosphinic acid metal salt-based flame retardant, product name: Pekoflam STC, available from Archroma, amount based on the total mass of the base layer and the top layer: 4.4% by mass) and a hydrophilic fumed silica (AEROSIL 50, available from Nippon Aerosil Co., Ltd., amount based on the total mass of the base layer and the top layer: 4.4% by mass) and the top layer was laminated on the transparent adhesive layer by dry lamination.

Comparative Example 1

A decorative material was produced as in Example 1, except that a polypropylene-based resin having a softening temperature of 160° C. was used as the base layer and the top layer.

The maximum height Rz on the rear face of the transparent resin film was 30 μm.

Comparative Example 2

A decorative material was produced as in Example 1, except that the top layer used was a polyethylene-based resin having a softening temperature of 120° C.

The maximum height Rz on the rear face of the transparent resin film was 30 μm.

Comparative Example 3

A decorative material was produced as in Example 1, except that the base layer used was a polypropylene-based resin having a softening temperature of 150° C. and the top layer used was a polyethylene-based resin having a softening temperature of 110° C.

The maximum height Rz on the back side of the transparent resin film was 30 μm.

<Softening Temperature>

The softening temperatures of the base layers and top layers used in the examples and comparative examples were determined as follows. Measurement in conformity with JIS K 7196:2012 "Testing method for softening temperature of thermoplastic film and sheeting by thermomechanical analysis" was performed using a thermomechanical analyzer (TMA SS6100, indenter tip diameter: 1.0 mm, available from Seiko Instruments Inc.) at a load of 500 mN, a rate of temperature rise of 5° C./min in a range of +30° C. to +200° C. in the penetration mode. In the resulting TMA curve, the straight line on a lower temperature side than the temperature at which the indenter starts to penetrate was extended to a higher temperature side, and the tangent line at the part where the penetration speed reached maximum was extended to a lower temperature side. The temperature at the intersection of these two extended straight lines was determined as the penetration temperature. The penetration temperature was used as the softening temperature.

<Maximum Height Rz>

The maximum height of the transparent resin film obtained in each of the examples and comparative examples was determined by the measurement with a surface profilometer ("SURFCOM-FLEX-50A" available from Tokyo Seimitsu Co., Ltd.) under the following conditions.

(Measurement Conditions)

Number of measurements: n=5 (at any five points)
    Standard for calculation: JIS'01
    Measurement type: roughness measurement
    Evaluation length: 12.5 mm
    Cut-off value: 2.5 mm
    Measurement speed: 0.60 mm/s
    Filter type: Gaussian filter
    Form elimination: straight line
    λs value: 8.0 μm In the case of a directional pattern of protrusions and depressions, the measurement was performed in the flow direction and in a direction perpendicular to the flow direction, and the larger measurement value was taken as the maximum height (Rz).

(Embossability)

The pattern of protrusions and depressions formed on the surface (on the side opposite to the side to be laminated on the substrate) of the decorative material obtained in each of the examples and comparative examples was visually observed and evaluated based on the following criteria. Table 1 shows the results.

++: The formed pattern was well embossed and the protrusions and the depressions were clear.

+: The embossed pattern was slightly unclear in some parts.

−: The formed pattern was poorly embossed and the pattern of protrusions and depressions was not clear.

(Laminatability)

The printed pattern of the decorative material obtained in each of the examples and comparative examples was visually observed and evaluated based on the following criteria. Table 1 shows the results.

+++: No air entrainment occurred and the printed picture layer was clearly visible.

++: Air entrainment slightly occurred and the printed picture layer was discolored (clouded) in a few parts.

+: Air entrainment occurred and the printed picture layer was discolored (clouded) in some parts.

−: Air entrainment occurred in many parts and the printed picture layer was not clearly visible in some parts.

(Evaluation on Flame Retardancy)

[Horizontal Flammability Test (Flame Retardancy: Unlikelihood of Flame Spread)]

Figure 5:
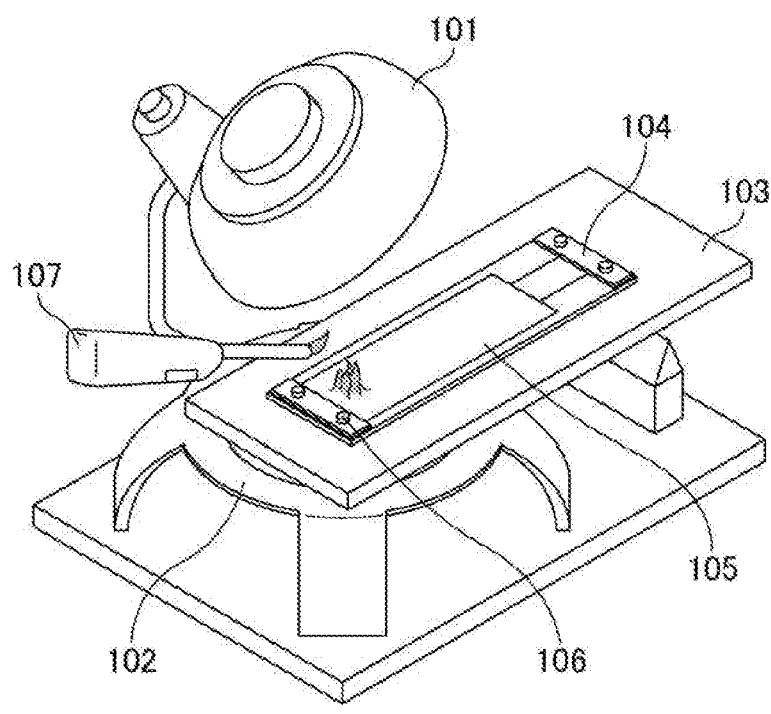
FIG. 5(*a*) and FIG. 5(*b*) are schematic views for explaining a method for evaluating flame retardancy.
Figure 5:
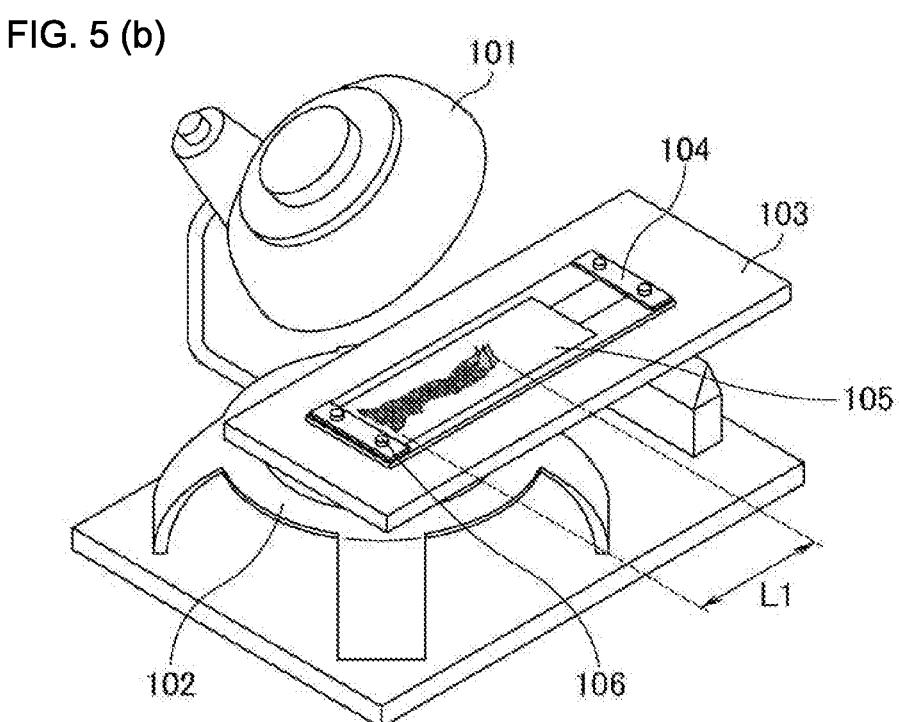

The decorative materials obtained in Examples 1 and 6 were each cut into a size of 9 cm×30 cm as a specimen. As illustrated in FIGS. 5(a) and 5(b), on a table 102 of a commercial household heater 101 (voltage: AC 100 V, power consumption: 1200 W) was placed a metallic rectangular board 103. A metallic frame 104 was set on the board 103, and a specimen 105 was placed inside the frame 104. The test for determining unlikelihood of flame spread was performed at a heater angle of 45° and a heater output of 4/5.

Specifically, the specimen was pre-heated using the household heater for two minutes. Then, as illustrated in FIG. 5(a), the specimen was heated with a lighter 107 at an end portion 106 on the heater side in the longitudinal direction of the specimen for one minute to catch flame, and the flame was allowed to spread in the longitudinal direction of the specimen 105 as illustrated in FIG. 5(b).

The state of flame spread was visually observed, and the distance of spread (L1) was evaluated as described below. Table 2 shows the results.

[Distance of Spread (L1)]

The flame spread distance was measured from the initial ignition of the specimen, excluding the flame of the lighter, as the distance of spread (L1). The distance of spread (L1) was evaluated based on the following criteria. One rated as + or better is acceptable in actual use.

+: L1 was shorter than 10 cm.

−: L1 was 10 cm or longer.

(Design Quality)

The printed patterns of the decorative materials obtained in Example 1 and Example 7 were visually evaluated. Table 3 shows the results.

++: The printed pattern was clearly visible.

+: The printed pattern was slightly clouded.

−: The printed pattern was not clearly visible.

TABLE 1

| | | Example 1 | Example 2 | Example 3 | Example 4 | Example 5 | Comparative Example 1 | Comparative Example 2 | Comparative Example 3 |
|---|---|---|---|---|---|---|---|---|---|
| Softening temperature | Base layer | 110° C. | 110° C. | 150° C. | 110° C. | 110° C. | 160° C. | 110° C. | 150° C. |
| | Top layer | 150° C. | 130° C. | 160° C. | 150° C. | 150° C. | 160° C. | 120° C. | 110° C. |
| Maximum height Rz (μm) | | 25 | 25 | 25 | 80 | 100 | 30 | 30 | 30 |
| Embossability | | ++ | + | ++ | ++ | ++ | ++ | − | − |
| Laminatability | | +++ | +++ | ++ | ++ | + | − | +++ | − |

TABLE 2

|  | Example 1 | Example 6 |
|---|---|---|
| Flame retardancy | − | + |

TABLE 3

|  | Example 1 | Example 7 |
|---|---|---|
| Design quality | + | ++ |

The decorative materials obtained in the examples had excellent embossability and laminatability, and therefore were confirmed to be able to provide high design quality.

In particular, in Example 1 in which the softening temperatures of the base and top layers and the maximum height Rz on the rear face of the transparent resin film were each within a preferred range, embossability and laminatability were particularly excellent.

In contrast, in Comparative Example 1 in which the softening temperature of the base layer was higher than the lamination temperature to the substrate, laminatability was poor. In Comparative Example 2 in which the softening temperature of the top layer was lower than the lamination temperature to the substrate, embossability was poor. In Comparative Example 3 in which the softening temperature of the base layer was higher than the lamination temperature to the substrate and the softening temperature of the top layer was lower than the lamination temperature to the substrate, embossability and laminatability were both poor.

The transparent resin film obtained in Example 6 in which a flame retardant was added to the top layer was confirmed to have higher flame retardancy than the transparent resin film obtained in Example 1 in which no flame retardant was added.

The transparent resin film obtained in Example 7 in which fumed silica was added together with a flame retardant to the top layer was confirmed to have higher transparency than the transparent resin film obtained in Example 1 in which no fumed silica was added.

INDUSTRIAL APPLICABILITY

The present invention can provide a transparent resin film that has excellent embossability and is capable of reducing or preventing air entrainment to provide high design quality.

The decorative material of the present invention including the transparent resin film of the present invention is suitably usable for interior materials for walls, ceilings, floors, and the like of buildings; joinery such as window frames, doors, and handrails; furniture; casings for household appliances, OA equipment, and the like; and exterior materials for front doors and the like.

REFERENCE SIGNS LIST 1 base layer
2 top layer
3 transparent adhesive layer
4 primer layer
5 surface protective layer
10 transparent resin film
11 substrate including a picture layer
20 decorative material
101 household heater 102 table of household heater
103 rectangular board
104 metallic frame
105 specimen
106 end portion
107 lighter

The invention claimed is:

1. A transparent resin film to be laminated on a substrate including a picture layer,
   the transparent resin film comprising at least a base layer and a top layer sequentially from a side to be laminated on the substrate,
   the transparent resin film having a pattern of protrusions and depressions on a side opposite to the side to be laminated on the substrate,
   the base layer having a lower softening temperature than the top layer, and
   the top layer consisting of thermoplastic resins.

2. The transparent resin film according to claim 1,
   wherein the base layer has a softening temperature of 100° C. or higher and 150° C. or lower.

3. The transparent resin film according to claim 1,
   wherein the top layer has a softening temperature of 130° C. or higher and 160° C. or lower.

4. The transparent resin film according to claim 1, having a maximum height Rz defined in JIS B 0601 (2001) of 80 μm or less on the side to be laminated on the substrate.

5. The transparent resin film according to claim 1, further comprising a surface protective layer on an opposite side of the top layer to the base layer.

6. The transparent resin film according to claim 5,
   wherein the surface protective layer contains a flame retardant.

7. The transparent resin film according to claim 6,
   wherein the flame retardant is at least one selected from the group consisting of a phosphinic acid metal salt-based flame retardant, a phosphazene-based flame retardant, and NOR hindered amine-based flame retardant.

8. A decorative material comprising:
   a substrate including a picture layer; and
   the transparent resin film according to claim 1 laminated on the substrate.

9. A method for producing a decorative material, comprising:
   laminating the transparent resin film according to claim 1 on a substrate including a picture layer at a temperature not lower than the softening temperature of the base layer and not higher than the softening temperature of the top layer.

10. A method for producing a decorative material comprising a substrate including a picture layer and the transparent resin film according to claim 1 sequentially, the method comprising:
    forming a transparent adhesive layer on a side to be laminated on the picture layer of the transparent resin film; and
    bonding the transparent resin film and the picture layer with the transparent adhesive layer.

11. The transparent resin film according to claim 2,
    wherein the top layer has a softening temperature of 130° C. or higher and 160° C. or lower.

12. The transparent resin film according to claim 2, having a maximum height Rz defined in JIS B 0601 (2001) of 80 μm or less on the side to be laminated on the substrate.

13. The transparent resin film according to claim 2, further comprising a surface protective layer on an opposite side of the top layer to the base layer.

14. A decorative material comprising:

a substrate including a picture layer; and the transparent resin film according to claim 2 laminated on the substrate.

15. A method for producing a decorative material, comprising:

laminating the transparent resin film according to claim 2 on a substrate including a picture layer at a temperature not lower than the softening temperature of the base layer and not higher than the softening temperature of the top layer.

16. A transparent resin film to be laminated on a substrate including a picture layer, the transparent resin film comprising at least a base layer and a top layer sequentially from a side to be laminated on the substrate, the transparent resin film having a pattern of protrusions and depressions on a side opposite to the side to be laminated on the substrate, the base layer having a lower softening temperature than the top layer, the top layer consisting of thermoplastic resins and one or more additives, wherein the one or more additives are at least one selected from the group consisting of colorants, flame retardants, fillers, matting agents, blowing agents, lubricants, antistatic agents, antioxidants, ultraviolet absorbers, light stabilizers, radical scavengers, and soft components, wherein the flame retardant, when present, is at least one selected from the group consisting of phosphinic acid metal salt-based flame retardant, phosphazene-based flame retardant, NOR hindered amine-based flame retardant, halogen-based flame retardant, antimony-based flame retardant, metal hydroxide-based flame retardant, and phosphoric acid ester-based flame retardant, and wherein the filler, when present, is an inorganic filler having a polar group on its surface.

\*    \*    \*    \*    \*